United States Patent
Mujica et al.

(10) Patent No.: US 6,983,032 B2
(45) Date of Patent: Jan. 3, 2006

(54) DIGITAL TIMING RECOVERY METHOD FOR COMMUNICATION RECEIVERS

(75) Inventors: Fernando A. Mujica, Allen, TX (US); Udayan Dasgupta, Richardson, TX (US); Sandeep Kesrimal Oswal, Bangalore (IN); Murtaza Ali, Plano, TX (US); Pradeep Kiran Sarvepalli, College Station, TX (US); Prakash Easwaran, Bangalore (IN); Diptendra Narayan Basu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 836 days.

(21) Appl. No.: 09/941,002

(22) Filed: Aug. 28, 2001

(65) Prior Publication Data

US 2003/0043945 A1    Mar. 6, 2003

(51) Int. Cl.
    *H03D 3/24*    (2006.01)
(52) U.S. Cl. .................. 375/375; 375/376; 375/371
(58) Field of Classification Search ............... 375/355, 375/371.373, 375, 376; 327/156–159, 146, 327/147, 149, 150, 152, 153
    See application file for complete search history.

(56) References Cited

U.S. PATENT DOCUMENTS

| | | | | |
|---|---|---|---|---|
| 5,646,968 A | * | 7/1997 | Kovacs et al. | 375/375 |
| 5,771,264 A | * | 6/1998 | Lane | 375/376 |
| 6,353,648 B1 | * | 3/2002 | Suzuki | 375/376 |
| 6,389,091 B1 | * | 5/2002 | Yamaguchi et al. | 375/376 |
| 6,788,754 B1 | * | 9/2004 | Liepe | 375/375 |

* cited by examiner

*Primary Examiner*—Phuong Phu
(74) *Attorney, Agent, or Firm*—Abdul Zindani; W. James Brady, III; Frederick J. Telecky, Jr.

(57) ABSTRACT

The present invention provides an apparatus, system and method for synchronizing a local clock signal with a remote clock signal in a communication network. Phase information is used to calculate a number of "clock jitters" per unit of time needed to synchronize the locally generated clock with the remote clock. Introducing (removing) a given amount of delay at a particular point in the local clock signal results in a positive (negative) jitter in which its minimum value defines the jitter resolution. The jitters are introduced to the local clock signal from a plurality of tapped delay line elements (310) selected by a phase selector (350) in response to a timing correction signal issued by a phase error module (520).

23 Claims, 3 Drawing Sheets

US 6,983,032 B2

DIGITAL TIMING RECOVERY METHOD FOR COMMUNICATION RECEIVERS

BACKGROUND OF THE INVENTION

1. Technical Field of the Invention

The present invention relates generally to a communication receiver and, more particularly, to an apparatus, system and method for digital timing recovery for a receiver in a communication system.

2. Description of Related Art

Matching of modulation and demodulation frequencies in a telecommunication system is made difficult by the physical separation of communication devices where each device is driven by its own local clock. For example, current Asymetrical Digital Subscriber Line (ADSL) systems operate according to Discrete Multitone (DMT) frequency multiplexing where generally only one of the communication devices has a master clock. Typically, the central office modem generates this masterclock. All corresponding client modems are thus required to recover the master clock signal from a communicated data stream for processing, such as sampling, demodulation, and transmission of upstream data to the central office modem.

Generally, the goal of a timing recovery scheme is to synchronize the receiver with the master or remote clock from base clock phase information contained directly or indirectly within the received communication data stream. The receiver translates this phase information to a timing correction. The nature of the correction depends on the type of recovery mechanism. For instance, on a voltage controlled oscillator (VXCO) based system the timing correction corresponds to a updated voltage applied to the VXCO as further described below.

FIG. 1 illustrates a block diagram of a conventional DMT receiver modem 102 in an ADSL system. The modem 102 receives signals from the telephone network at the analog-to-digital converter (ADC) 104 after analog processing. The signals received not only include the communicated data message but also include clock phase information or a pilot tone generated by the transmitting modem to communicate the frequency at which it carried out the modulation of the data message. The received signal is subsequently processed 106 for message recovery for application to a host and for other operations such as timing recovery. For example, the processor 106 extract frequency offset information from the received and convert it into an analog signal through a digital-to-analog converter (DAC) 108. The converted signal is then applied to a voltage controlled oscillator (VCXO) 110 which responds to the analog signal corresponding to the desired frequency to control the ADC 104, such that the time-domain sampling and conversion of the incoming received communication is performed at a frequency that matches that of the transmitting modem.

However, the VCXO 110 implementation is an expensive approach especially on client-side modem systems. Furthermore, fluctuations in the control voltage applied to VCXO 110 by the DAC 108 causes undesirable frequency jitter at the output of the VCXO 110. Reducing this undesirable jitter requires complex circuitry susceptible to age and temperature variation; and creates a phase-locked loop with a narrow frequency operating range. As a result, the conventional modem construction, as shown in FIG. 1, includes expensive oscillator circuitry and requires expensive voltage regulation devices to achieve the timing accuracy needed.

SUMMARY OF THE INVENTION

The present invention achieves technical advantages as an apparatus system and method for synchronizing a local clock signal with a remote clock signal in a communication network. Phase information is used to calculate a number of "clock jitters" per unit of time needed to synchronize the locally generated clock with the remote clock. Introducing (removing) a given amount of delay at a particular point in the clock signal results in a positive (negative) jitter in which its minimum value defines the jitter resolution. The jitters are introduced to the local clock signal from a tapped delay line apparatus which includes a plurality of delay elements selectable by a phase selector in response to a timing correction signal.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Although the present application describes a methodology in terms of an asymmetric digital subscriber line (ADSL)

communication system, its applicability is general. More specifically, the techniques described can be applied to other communication receivers that requires local timing synchronization to a transmitter clock by means of received information indicative of the remote clock signal.

A digital timing recovery scheme of the present invention uses phase information to calculate how many "clock jitters" per unit of time are needed to synchronize a locally generated clock with a remote clock. A jitter is defined as a temporary delay of the clock. Introducing (removing) a given amount of delay at a particular point in the clock signal results in a positive (negative) jitter. The amount of delay added or removed is quantized, hence the term digital timing recovery, and its minimum value defines the jitter resolution. Since the digital timing recovery attempts to "lock" the local receiver clock phase to that of the remote clock, this approach will be referred to as a digital phase lock loop (DPLL) method.

At least one of the digital timing recovery schemes of the present invention introduces jitters using an advantageous combination of two mechanisms. The first is based on the NCO concept and the second uses the tapped delay line.

Figure 1:
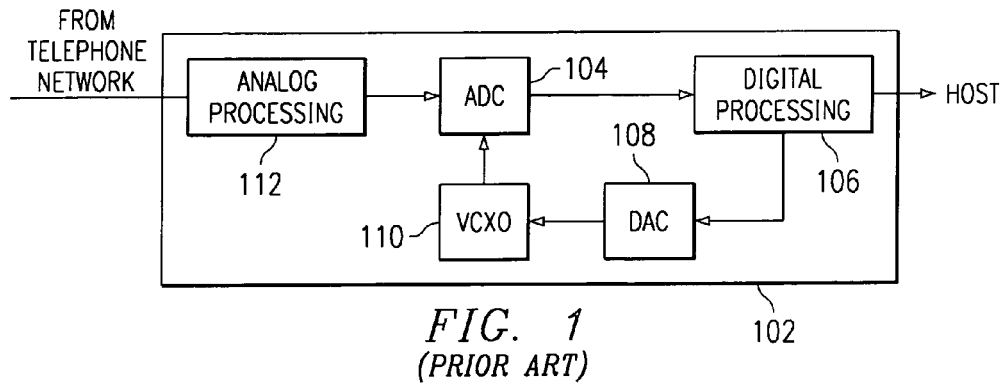
FIG. 1 illustrates a simplified block diagram of a conventional Discrete Multitone receiver modem in an Asymetrical Digital Subscriber Line system.
Figure 2:
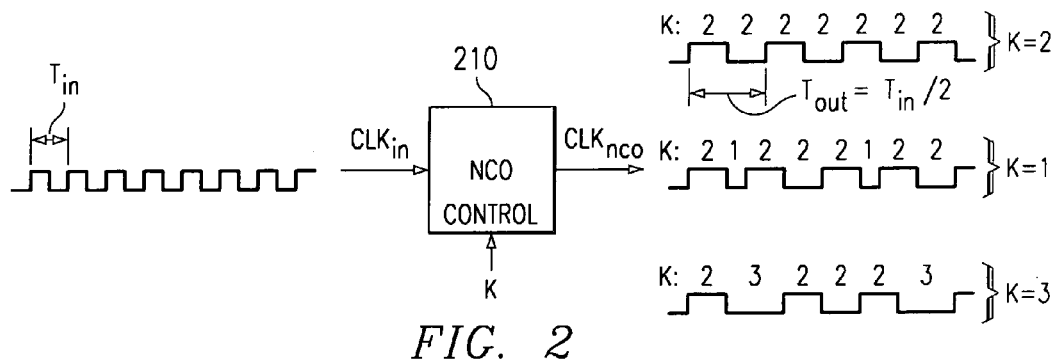
FIG. 2 illustrates a block diagram for a numerically controlled oscillator for timing recovery in a communication system in accordance with an exemplary embodiment of the present invention.

Referring now to FIG. 2, there is illustrated a numerically controlled oscillator (NCO) in accordance with an exemplary embodiment of the present invention. A more complete description of an NCO can be found in co-pending application Ser. No. 09/282,403, entitled "PHASE AND FREQUENCY OFFSET COMPENSATION IN A TELECOMMUNICATIONS RECEIVER", filed on Mar. 31, 1999, the disclosure of which is hereby incorporated by reference.

In general, the timing resolution of an NCO-only approach maybe limited by the maximum frequency supported by the implementation. In many cases, this limitation prevents the NCO-only approach to match the performance of more common timing recovery schemes like those based on, a voltage controlled crystal oscillator (VCXO). Although the NCO-only approach offers a cost benefit over its VCXO counterpart, it is possible to improve upon its performance with minimal impact in hardware cost or software complexity.

Within the exemplary NCO mechanism of the present invention, a NCO jitter generator 210 operates at a clock frequency of, $$f_{in} \approx N \times f_{adc},$$

where $f_{adc}$, is the desired ADC clock frequency and N is an integer. A divider device can then be used to divide the input clock frequency to the desired or synchronized frequency, i.e., $f_{nco} \approx N \times f_{adc}/K$.

Ideally, if the input clock ($CLK_{in}$) has a frequency of $f_{in}=N \times f_{adc}$, a divider count of K=N will produce the desired ADC frequency. In the more realistic case where $f_{in} \neq N \times f_{adc}$, infrequent changes of the divide count away from its nominal value N results in a timing jitter and results in a frequency shift. The jitter resolution correspond to a change of K from N to N+1 or N−1, which in time units corresponds to $|\Delta t_{nco}|=1/f_{in}$ or one period of the higher frequency clock. Notice that to introduce a jitter in a particular cycle of the output clock the divide counter K is changed temporarily for that clock cycle and then reset to its nominal value N.

Three exemplary output clocks for N=2 with no jitters (K=2), two negative jitters (K=1), and two positive jitters (K=3) are shown in FIG. 2. The top clock corresponds to no jitter correction, the middle and bottom clocks present a jitter correction at the first and third clock cycles, a negative and a positive correction, respectively. Introducing periodic positive (negative) jitters reduces (increases) the average sampling frequency. From this figure the frequency offset generated by the jitters can be seen. Using the nominal divide counter (K=2), there are 4 cycles in the period of time. In the same period of time, the K=1 and K=3 result in about 4.5 and 3.5 cycles, respectively.

Figure 3:
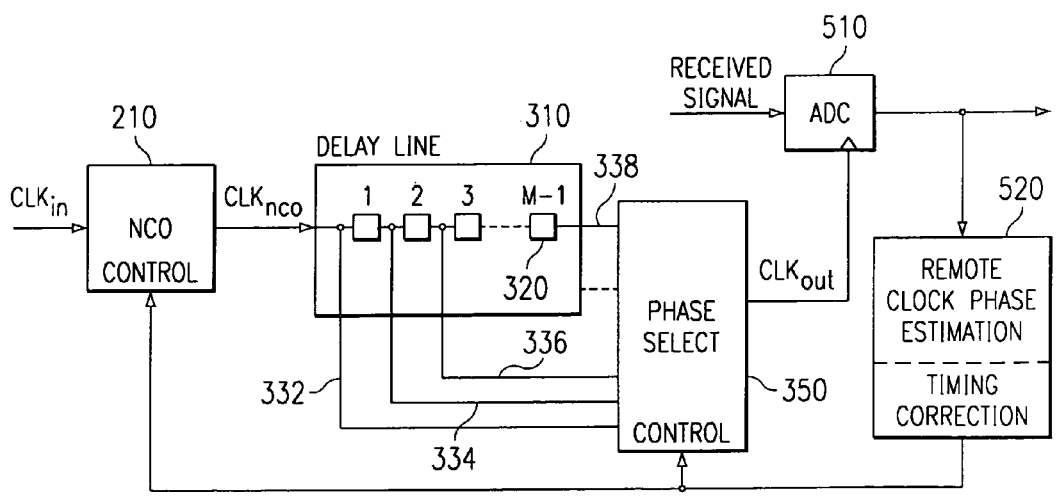
FIG. 3 illustrates a block diagram of a digital phase lock loop apparatus for timing recovery in a communication system in accordance with an exemplary embodiment of the present invention.

Referring now to FIG. 3, there is illustrated a digital timing recovery system combining a NCO scheme and a tapped delay line scheme in accordance with an exemplary embodiment of the present invention. Timing jitters are also introduced by selecting one out of M different clock phases. Each of these phases is tapped from a delay line 310.

The delay line 310 comprises M-1 delay elements 320 in which each delay element introduces a predetermined phase delay to the locally introduced clock signal ($CLK_{in}$). Thus, selecting delay line 332 introduces no phase delay, selecting delay line 334 introduces a single phase delay unit, selecting delay line 336 introduces two phase delay units, and selecting delay line 338 introduces M−1 phase delay units. Each phase delay unit introduces a delay of $\Delta t_{delay}$. The phase select 350 is a switch to couple the multiple tapped delay lines (clock signal output $CLK_{out}$) to the ADC 510. The ADC 510 takes a continuous time signal as in input, e.g., the voltage induced in a digital subscriber line (DSL) or in a communication antenna by the transmitted signal, and converts it to the digital domain by taking samples of such analog signal at given sampling points. Typically, the sampling points are defined by the rising (or lowering) edges of the ADC clock. In addition, each sample is quantized and represented in the digital domain.

In the combined approach, when a delay request reaches the boundaries of the delay line, it "wraps around" and at the same time produces a corresponding NCO jitter. For example, when a delay request reaches the M−1 phase delay 320 limit, a NCO timing jitter is introduced to the clock signal $CLK_{in}$ resulting in a clock signal $CLK_{nco}$ in which the NCO timing jitter is equivalent to a predetermined plurality of tapped phase delays. Provided that each element in the delay line introduces a delay of $\Delta t_{delay} = \Delta t_{nco}/M$, this allows for the introduction of delays (jitters) indefinitely.

A high frequency input clock $CLK_{in}$ is used and which is divided down (coarsely jittered) by the NCO module 210. The resulting clock $CLK_{nco}$ is passed to the delay line module 310 where selection of different phases can finely jitter the resulting clock $CLK_{out}$ that drives the ADC 510. The phase select module must prevent any clock glitches while switching between phases. That is to say, the switch to a high signal is made at a point where the incoming signal is also high. The jitter commands are issued on phase error (with respect to the remote clock) information that is extracted from the received signal by the clock phase estimation/timing correction circuits or phase error module 520. The phase error module 520 analyzes the phase variation of the receive signal at one time instant versus that of a previous time instant. This phase error is related to the frequency offset of the far-end and local oscillators by taking into account the time elapsed between the phase measurements and the relative frequency of the received signal used for timing acquisition and tracking.

Figure 4A:
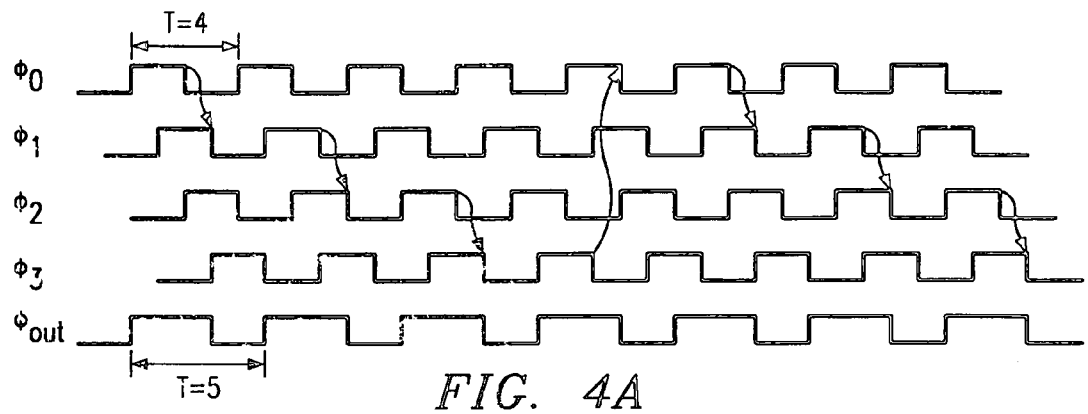
FIGS. 4A and 4B illustrate exemplary timing plots of the input clock and delay elements for the digital phase lock loop apparatus illustrated in FIG. 3.
Figure 4B:
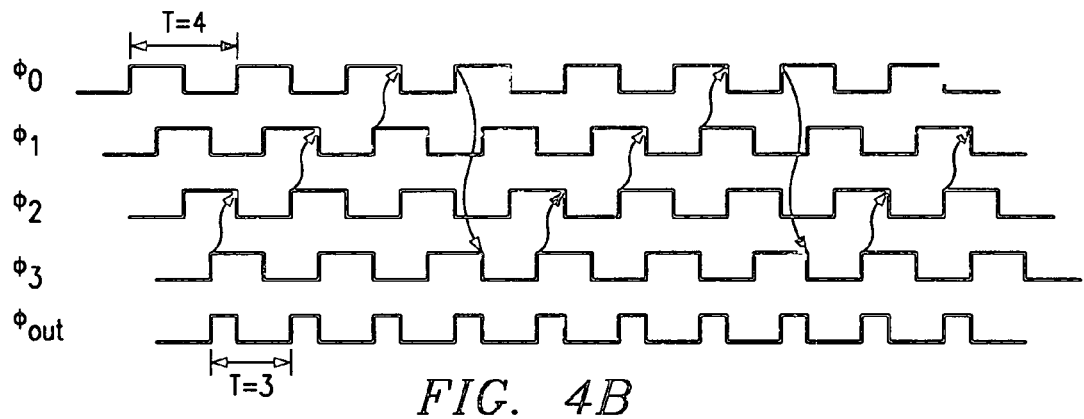

The following illustrates the operation of the NCO plus delay line DPLL approach. Consider a NCO with resolution of 4 seconds and a three-element tapped delay line with resolution of 1 second. Also, assume the period of the input clock to the NCO to be 16 seconds. FIGS. 4A and 4B illustrate the input clock to the NCO $M_0$ and the three delayed versions of it $M_1$, $M_2$, $M_3$. In this example, the output clock $M_{out}$ frequency is corrected from the nominal of 1/16 to 1/17 (positive jitters, FIG. 4A) and 1/15 (negative jitters, FIG. 4B). To accomplish this, a timing correction signal is issued to command switching between the phases at every clock cycle, i.e., increase (decrease) the period of the output clock by switching to the next (previous) clock phase at every cycle. Once the last (first) clock phase is reached, it wraps-around to the first (last) phase and at the same time increment (decrement) the NCO counter by one for that clock cycle. The resulting clock has then the desired frequency. By repeating this process less often (as opposed to every clock cycle) a finer frequency resolution can be achieved. Note that the "switching points" are always at the same offset with respect to the rising edge of the clocks irrespective of whether positive or negative jitters are introduced. In the example above, the switching point is 3 seconds after the rising edge of the clocks.

Figure 5:
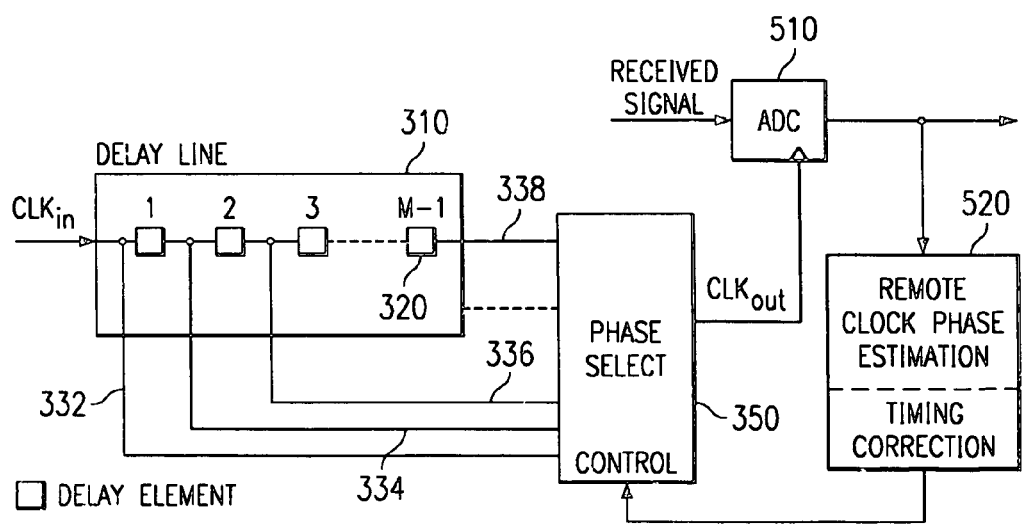
FIG. 5 illustrates a block diagram of a tapped delay line-only approach for timing recovery in a communication system in accordance with an exemplary embodiment of the present invention.

Referring now to FIG. 5, there is illustrated a tapped delay line-only scheme for digital timing recovery in accordance with an exemplary embodiment of the present invention. Timing jitters are only introduced by selecting from the M different clock phases of the delay line 310. Each of the individual phases is tapped from the delay line 310.

The delay line 310 comprises M-1 delay elements 320 in which each delay element introduces a predetermined phase delay to the locally introduced clock signal ($CLK_{in}$). As shown, selecting delay line 332 introduces no phase delay, selecting delay line 334 introduces a single phase delay unit, selecting delay line 336 introduces two phase delay units, and selecting delay line 338 introduces M-1 phase delay units. Each phase delay unit introduces a delay of $\Delta t_{delay}$. The phase select 350 is a switch to couple the tapped delay line to the clock signal output ($CLK_{out}$) that drives the ADC 510. The jitter commands are issued on phase error (with respect to the remote clock) information that is extracted from the received signal by the phase error module 520.

Figure 6A:
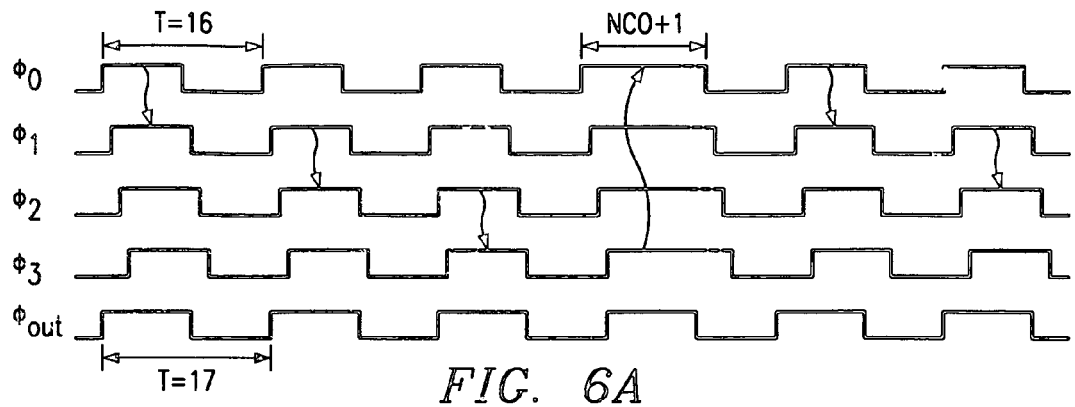
FIGS. 6A and 6B illustrate exemplary timing plots of the input clock and delay elements for the tapped delay line-only approach illustrated in FIG. 5.
Figure 6B:
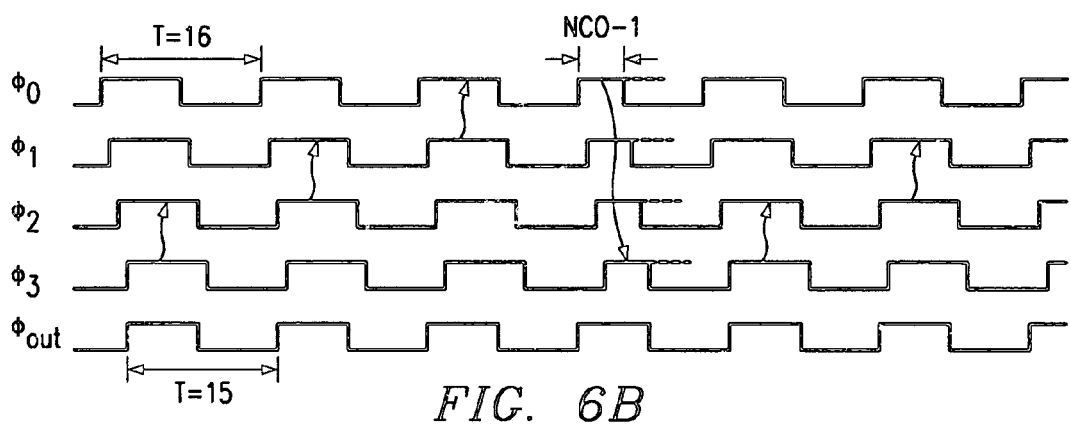

The following illustrates the timing requirements for a tapped delay line-only approach. Assume that the input clock has a period of 4 seconds and that a three-element delay line with 1 second resolution is used. FIGS. 6A and 6B show the input clock $M_0$ and the three delayed versions of it $M_1$, $M_2$, $M_3$. FIG. 6A shows the introduction of one positive jitter at each clock cycle to reduce the frequency from the nominal ¼ to ⅕. FIG. 6B shows the introduction of one negative jitter at each clock cycle to increase the frequency from the nominal ¼ to ⅓. Similar to the case when the NCO is used, when the switch reaches the last (first) clock phase, it wraps around to the first (last) phase. The resulting clock has the desired frequency. Again, following this procedure less often enables finer frequency resolutions to be achieved. The "switching points" for positive and negative jitters are at the rising and lowering edge of the clock, respectively. If this timing is not followed, undesired glitches in the output clock might occur.

Comparing this approach with that using the NCO as well (previous section), we note that to achieve the same frequency resolution (assuming a fixed tapped delay line resolution) the tapped delay line only approach required 16 phased (15 delay elements) and an input clock with period 16 seconds. In addition, the switching logic for the tapped delay line only approach is slightly more complicated since it needs to operate differently for positive and negative jitters.

Figure 7:
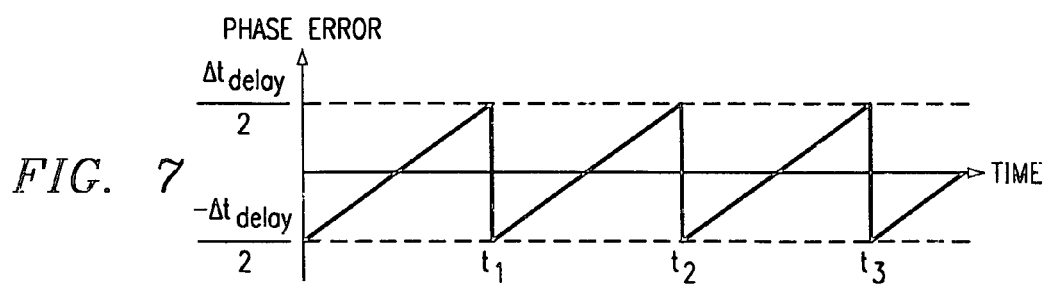
FIG. 7 illustrates a phase error plot for the digital phase lock loop approach illustrated in FIGS. 3 and 5 with instantaneous phase estimation capability in accordance with an exemplary embodiment of the present invention.

The approach used to calculate the number of jitters depends on the nature of the error phase estimator. For a phase error module 520 enabled to produce an instantaneous estimate, a jitter is produced every time the magnitude of the phase error becomes larger than ½ the equivalent jitter resolution $\Delta t_{delay}$, with a jitter polarity depending on whether the phase error is positive or negative. This results in an optimum jitter distribution over time. FIG. 7 illustrates a phase error plot for the DPLL approach with instantaneous phase estimation. The slope of the phase error curve over time corresponds to the frequency offset between the remote and local oscillators, the discontinuities at $t_1$, $t_2$ and $t_3$ are the result of a timing correction through the DPLL mechanism.

In practice, instantaneous phase information may not be available, instead, in accordance with an exemplary embodiment of the present invention, the phase error is estimated over a period of time (L). Based on this information, the timing correction to be applied in the next frame is calculated as follows: NumJitters(L)= round($\Delta t_{error}(L)/\Delta t_{delay}$), where $\Delta t_{error}(L)$ is the phase error in seconds estimated over a frame of duration L. NumJitters(L) represents the number of jitters needed in the next frame of L seconds. Round refers to rounding to the nearest integer.

The number of jitters can be distributed throughout the frame in different ways. Two possibilities are: 1) All jitters at one clock cycle or on consecutive clock cycles; and 2) Equally spacing the jitters throughout the frame to produce a smoother sampling profile resulting in an improved signal to noise ratio (SNR) as compared to that obtained with the aforementioned single jittering approach. This jittering distribution scheme is referred to as the multiple jitter approach. The multiple jitter approach, explained in detail in the next sub-section, is a significant feature that differentiates this contribution from the single jittering approach.

The multiple jittering mechanism in the DPLL based system starts after the error phase estimation and calculation of the required number of jitters is performed. These operations occur in a periodic basis with a period L. The jitters are spread throughout the frame. For an optimum distribution, the jitters should be equally spaced and centered within the frame boundary. The optimum spacing between jitters (T) is calculated as T=L/NumJitters(L). It should be appreciated that other jitter spacing can be selected.

A multiple jitter approach for optimum jitter distribution is described in the following pseudo-code for the NCO plus tapped delay line DPLL method:

1. Estimate clock phase error, calculate NumJitter(J) and T
2. Set clock countdown to T/2 and jitter counter to NumJitter(J)
3. If clock count down=0
    4. If jitter counter>0
        5. Decrement jitter counter
        6. If phase select=(M−1)
            7. Set phase select to 0
            8. Set NCO divider counter K to (N+1)
        9. Else
            10. Increment phase select
    11. If jitter counter<0
        12. Increment jitter counter
        13. If phase select=0
            14. Set phase select to (M−1)
            15. Set NCO divider counter K to (N−1)
        16. Else
            17. Decrement phase select
    18. After jitter is executed, set NCO divider counter K to N
    19. Set clock count down to T
20. Else
    21. Decrement clock countdown by one
22. Back to 3.

Figure 8:
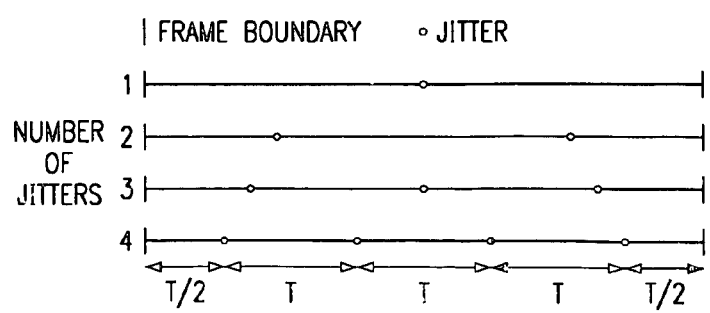
FIG. 8 illustrates a jitter distribution for the digital phase lock loop approach illustrated in FIGS. 3 and 5 with jitter distribution capability in accordance with an exemplary embodiment of the present invention.

This implementation will result in the desired jittering distribution as illustrated in FIG. 8 for cases requiring one through four jitters. Removing the steps involving the NCO from the pseudo code above, results in the steps required to implement the multiple jitter approach for the tapped delay line-only DPLL method.

Step 2 above enables the jitters to be, apart from being equally spaced, centered with respect to the frame boundary. This arrangement, which is illustrated in FIG. 8 for different number of jitters, minimizes the timing errors produced by the non-linear sampling. In this figure, T represents the period value. In at least one embodiment, a DSP provides the correct value for the period so that the number of jitters times the period equals the number of samples in a frame, i.e., T=NUM_SAMPLES_PER_FRAME/NUM_JITTERS.

A digital timing recovery scheme based on the concept of jittering the ADC clock has been illustrated. For a given maximum realizable clock frequency, this approach can improve the timing accuracy by a factor of M. The proposed multiple jitter approach provides the optimum jitter distribution which result in a maximum SNR for a given jitter resolution. It has been demonstrated through simulations that using the DPLL timing recovery method in an ADSL systems can at least match the performance of much more expensive VCXO based solutions.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for timing recovery for a receiver in a communication system, said apparatus comprising:
    a phase estimator having an input for receiving phase information corresponding to a remote clock signal associated with a data signal and operable to determine a phase error with respect to said remote clock signal and a local clock signal, said phase estimator further operable to translate said phase error for timing correction of the local clock signal and issue a corresponding correction signal; and
    a first clock modifier having an input for receiving said local clock signal and operable to apply a first phase modifier responsive to said issued correction signal, said first clock modifier further having an output for issuing a synchronized clock signal, wherein said synchronized clock signal is received as a drive signal by an analog-to-digital converter which converts said data signal at a sampling frequency responsive to said synchronized clock signal.

2. The apparatus of claim 1, wherein said first clock modifier further includes a delay line having a plurality of delay elements, wherein each delay element introduces a predetermined clock jitter to said local clock signal.

3. The apparatus of claim 2, wherein clock jitters are applied to said local clock signal in an equal distribution over a time duration.

4. The apparatus of claim 2, wherein said delay elements are serially coupled.

5. The apparatus of claim 4, wherein said first clock modifier further includes a phase selector having an input for receiving a tapped coupling from each of said delay elements, a serial coupling of all delay elements, and said local clock signal, wherein said phase selector is further operable to select a clock jitter responsive to said issued correction signal.

6. The apparatus of claim 1, further including an oscillator having an input for receiving said local clock signal and operable to apply a second phase modifier to said local clock signal responsive to said issued correction signal in combination with said first clock modifier applying said first phase modifier, wherein the input of said first clock modifier receives an output of the oscillator.

7. The apparatus of claim 6, wherein said first clock modifier includes a delay line having a plurality of serially coupled delay elements, wherein each delay element introduces a predetermined phase delay to said output of the oscillator, wherein said second clack modifier introduces a greater phase clock jitter to said local clock signal than a clock jitter introduced by said first clock modifier.

8. The apparatus of claim 7, wherein clock jitters are applied to said local clock signal in an equal distribution over a time duration.

9. The apparatus of claim 7, wherein said first clock modifier further includes a phase selector having an input for receiving said serially coupled delay elements, a tapped coupling from each of said delay elements, and a clock signal from said second clock modifier, wherein said phase selector is further operable to select a clock jitter responsive to said issued correction signal.

10. A system for synchronizing a local clock signal with a remote clock signal from phase information associated with a data signal transmitted in a communication network, said system comprising:
    a signal converter having an input for receiving said data signal and operable to convert said data signal at a sampling frequency responsive to a synchronized clock signal;
    a phase estimator having an input for receiving said phase information corresponding to said remote clock signal and operable to determine a phase error with respect to said remote clock signal, said phase estimator further operable to translate said phase error for timing correction of a local clock signal and issue a corresponding correction signal; and
    a first clock modifier having an input for receiving said local clock signal and operable to apply a first phase modifier responsive to said issued correction signal, said first clock modifier further having an output coupled to said signal converter for issuing a synchronized clock signal.

11. The system of claim 10, wherein said first clock modifier further includes a delay line having a plurality of delay elements, wherein each delay element introduces a predetermined clock jitter to said local clock signal.

12. The system of claim 11, wherein clock jitters are applied to said local clock signal in an equal distribution over a time duration.

13. The system of claim 11, wherein said delay elements are serially coupled.

14. The system of claim 10, wherein said first clock modifier further includes a phase selector having an input for receiving a tapped coupling from each of said delay elements, a serial coupling of all delay elements, and said local clock signal, wherein said phase selector is further operable to select a clock jitter responsive to said issued correctional signal.

15. The system of claim 10, further including an oscillator having an input for receiving said local clock signal and operable to apply a second phase modifier to said local clock signal responsive to said issued correction signal in combination with said first clock modifier applying said first phase modifier, wherein the input of said first clock modifier receives an output of the oscillator.

16. The system of claim 15, wherein said first clock modifier includes a delay line having a plurality of serially coupled delay elements, wherein each delay element introduces a predetermined clock jitter to said output of the oscillator, wherein said second clock modifier introduces a greater clock jitter to said local clock signal than a clock jitter introduced by said first clock modifier.

17. The system of claim 16, wherein clock jitters are applied to said local clock signal in an equal distribution over a time duration.

18. A method of synchronizing a local clock signal with a remote clock signal from phase information associated with a data signal transmitted in a communication network, comprising:
   determining a phase error with respect to said remote clock signal;
   determining a number of clock jitters to be applied over a data frame of a time duration to synchronize a local clock signal with said remote clock signal; and
   applying said clock jitters to said local clock signal in an equal distribution spacing over said time duration and centered within a boundary of said data frame, wherein a time between clock jitters is equal to said time duration divide by said determined number of clock jitters.

19. The method of claim 18, wherein a clock jitter is applied to said local clock signal from a tapped delay line comprising a plurality of serially coupled delay elements coupled to a phase selector, wherein said delay elements are further individually coupled to said phase selector, said phase selector operable to apply said distributed clock jitters responsive to said determined phase error.

20. The apparatus of claim 6, wherein the oscillator is a numerically controlled oscillator.

21. The system of claim 15, wherein the oscillator is a numerically controlled oscillator.

22. A system for synchronizing a local clock signal with a remote clock signal from phase information associated with a data signal transmitted in a communication network, said system comprising:
   a phase estimator having an input for receiving said phase information corresponding to said remote clock signal and operable to determine a phase error with respect to said remote clock signal and a number of clock jitters to be applied over a data frame of a time duration to synchronize the local clock signal with said remote clock signal; and
   a phase selector operable to generate a synchronized clock signal by applying said clock jitters to said local clock signal in an equal distribution spacing over said time duration and centered within a boundary of said data frame, wherein a time between clock jitters is equal to said time duration divide by said determined number of clock jitters.

23. A system according to claim 22, further comprising: a signal converter having an input for receiving said data signal and operable to convert said data signal at a sampling frequency responsive to the synchronized clock signal.

* * * * *